United States Patent [19]  [11] Patent Number: 4,896,697
Strömdahl  [45] Date of Patent: Jan. 30, 1990

[54] COUPLING FOR CONNECTING LIQUID CONDUITS

[76] Inventor: Leif Strömdahl, Klackjärnsliden 3, Karlstad, Sweden, S-654 81

[21] Appl. No.: 326,546
[22] PCT Filed: Oct. 20, 1987
[86] PCT No.: PCT/SE87/00481
    § 371 Date: Mar. 6, 1989
    § 102(e) Date: Mar. 6, 1989
[87] PCT Pub. No.: WO88/03243
    PCT Pub. Date: May 5, 1988

[30] Foreign Application Priority Data

Oct. 22, 1986 [SE] Sweden ................................ 8604489

[51] Int. Cl.$^4$ .............................................. F16L 29/00
[52] U.S. Cl. ................................ 137/614.03; 137/614
[58] Field of Search .............. 137/614, 614.04, 614.05, 137/614.03

[56] References Cited

U.S. PATENT DOCUMENTS

| 2,850,298 | 9/1958 | Clerk | 137/614.03 |
| 3,097,867 | 7/1963 | Salomon | 137/614.03 X |
| 4,124,228 | 11/1978 | Morrison | 137/614.03 X |
| 4,289,164 | 9/1981 | Ekman . | |
| 4,685,490 | 8/1987 | Medirck et al. | 137/614.03 |

FOREIGN PATENT DOCUMENTS

| 148366B | 4/1981 | Denmark . |
| 2854511 | 8/1981 | Fed. Rep. of Germany . |
| 428721 | 7/1983 | Sweden . |

Primary Examiner—John Fox
Attorney, Agent, or Firm—Nixon & Vanderhye

[57] ABSTRACT

A coupling for connecting liquid conduits is disclosed, said coupling comprising an insert nipple (1) and a receiving nipple (15), said nipples being axially moveable in relation to each other for connection and disconnection. The insert nipple (1) comprises a stationary sleeve (2) with a sealing valve body (3) spring-biased and inwardly axially movable therein. The receiving nipple (15) has an outer sleeve (16), an inner spring-biased and inwardly axially movable sealing sleeve (17) and a stationary valve central stay (28) which in disconnected condition sealingly cooperates with the sealing sleeve (17). According to the invention the sealing sleeve (17) is provided at its outer end portion with an inner wedge seal (21) arranged to sealingly cooperate with a wedge-forming conical outer surface (4) on the front end portion of the outer sleeve (2) and comprising a conical support ring (21b). Further, an inner seal (26) is arranged in a groove (26a) in the outer sleeve (16) for radial sealing cooperation with the sealing sleeve (17), and the distance between circumferentially located locking balls (19) in the outer sleeve (16) and said inner seal (26) is greater than the distance within which the sealing sleeve (17) is axially movable inside the outer sleeve (16). The sealing sleeve (17) is provided on its inner side with a seal (22) which in disconnected condition is arranged to seal against a cylindrical sealing surface (28a) of a sealing valve body (28c) of the valve central stay (28) and which comprises a sealing ring (22a) and a seal holder (23). The sealing sleeve (17) and outer sleeve (16) are provided with cooperating support means (17a, 16a; 33, 33a, 16a) permitting the sealing sleeve (17) to take up liquid pressure in disconnected condition in order to relieve the valve central stay (28).

9 Claims, 7 Drawing Sheets

COUPLING FOR CONNECTING LIQUID CONDUITS

The present invention relates to a coupling for connecting liquid conduits, comprising an insert nipple and receiving nipple, said nipples being axially moveable in relation to each other for connection and disconnection, said insert nipple comprising a stationary sleeve with a sealing valve body spring-biased and inwardly axially movable therein, said receiving nipple having an outer sleeve, an inner spring-biased and inwardly axially movable sealing sleeve and a stationary valve central stay which in disconnected condition sealingly cooperates with the sealing sleeve.

Developments in hydraulic technique are moving towards the use of higher operating pressure because of the fact that higher power can be obtained from smaller, lighter machines or tools, instead of increasing the flow quantity, resulting in considerably higher pressure drops (loss of power) in the hydraulic system and larger machines. This increase of operating pressure places greater demands on the sealing elements of the hydraulic system, of which sealing joints containing O-rings are one type. The O-rings are affected by pressure so that the rubber tends to spread at high pressure levels into the play or gap between the surrounding construction elements on the pressure-free side, resulting in permanent damage to the O-ring, and consequently considerable reduced sealing effect and service life. A usual method of dealing with the increased operating pressure is to mount O-rings with greater hardness, e.g. 90° Shore. Such a solution is simple and relatively inexpensive but has the disadvantage that the elasticity and flexibility of the O-ring is reduced due to the increased hardness, thus resulting in quicker and increased wear. In constructions with spring-return plungers or piston rods, etc. (e.g. quick couplings), less radial compression of an O-ring having a hardness of 90° Shore is required to reduce the friction of the seal, with resultant reduction in service life of this sealing joint. One method of solving this problem is to use ordinary support rings or so-called compact seals, the purpose of which is to prevent the O-ring from spreading into the play or gap between the construction elements. Since the parts included are not vulcanized, no stress state occurs, thus preventing the properties of the various materials to be fully utilized. Well reinforced seals tend to separate due because of fatigue due to the different degrees of elasticity of the materials used. One drawback with the sealing constructions of O-ring type described above is that their service life is shortened by pulsating operating pressure since the O-ring slides to and for in its sealing position as the pressure changes. The support ring must also abut adjacent pipes and shafts, which means that softer plastic material such as polytetrafluorethylene or thermoplastic elastomers must be used, making the construction sensitive to high pressure peaks.

The object of the present invention is to provide a spill-free quick coupling which satisfies the desires of manufacturer, user and servicing to the greatest possible extent and which has improved seals with increased service life and which will withstand high pressure peaks.

This is achieved by the invention in that the sealing sleeve is provided at its outer end portion with an inner wedge seal arranged to sealingly cooperate with a wedge-forming conical outer surface on the front end portion of the outer sleeve and comprising a conical support ring; that an inner seal is arranged in a groove in the outer sleeve for radial sealing cooperation with the sealing sleeve which is free from sealing grooves; that the distance between circumferentially located locking balls in the outer sleeve and said inner seal is greater than the distance within which the sealing sleeve is axially movable inside the outer sleeve; that the sealing sleeve is provided on its inner side with a seal which in disconnected condition is arranged to seal against a substantially cylindrical sealing surface of a sealing valve body of the valve central stay and which comprises a sealing ring and a seal holder; and that the sealing sleeve and outer sleeve are provided with cooperating support means permitting the sealing sleeve to take up liquid pressure in disconnected condition in order to relieve the valve central stay.

The invention will be described further in the detailed description which follows, with reference to the accompanying drawings, in which

FIGS. 9 and 9a show a support ring for an inner seal according to FIGS. 8 and 8a.

Figure 1:
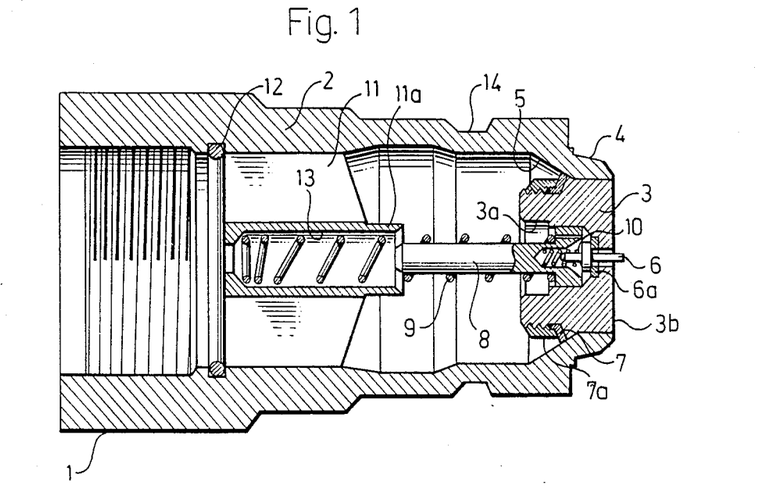
FIG. 1 is a longitudinal section view of the insert nipple of a coupling according to one embodiment of the invention.

With reference to FIG. 1 it is shown therein a first coupling part in the form of an insert nipple 1 comprising a stationary outer sleeve 2 in which a short central sealing valve body 3 in disconnected condition seals against the internally conical surface 5 of the outer sleeve 2. The sealing valve body 3 has a flat, free, outwardly facing engagement surface 3b located perpendicular to the central axis of the insert nipple 1.

Closing of the insert nipple 1 in its disconnected condition is effected by the relatively short sealing valve body 3 which is provided with a seal 7 to seal against the internally conical surface 5 of the outer sleeve 2, the surface 5 having a small angle so that flow losses are nearly eliminated. The seal 7 is retained by a tapped locking sleeve 7a. In its disconnected condition the sealing valve body 3 is pressed against the conical surface 5 by means of a spring 9, centered by an inner guide surface 13 of a central stay 11 and by a centering pin 8. The central stay 11 is held in place by a retaining ring 12, the central stay 11 being provided with an external centering surface 11a which centres the sealing valve body 3 and keeps it in its connected condition in the insert nipple 1. The sealing valve body 3 is provided internally with a recess surrounding the centering pin 8 and having a cylindrical centering surface 3a which surrounds and cooperates with said centering surface 11a of the central stay 11 in connected condition. Furthermore, the nose section of the insert nipple is provided with a conical outer surface 4 (in fact a truncated cone) with wedge-forming function as will be described below. Seen in longitudinal cross section according to FIG. 1, this conical surface 4 is entirely straight.

The construction described above with a short sealing valve body 3 and an associated central stay 11 which centres first when the coupling parts have been entirely brought together (FIG. 3a), means that the sealing valve body 3 need not have any part resembling a valve body with a long, coaxially journalled surface, which would make the sealing valve body considerably more expensive due to the need for more material, external turning and hole boring.

Figure 2:
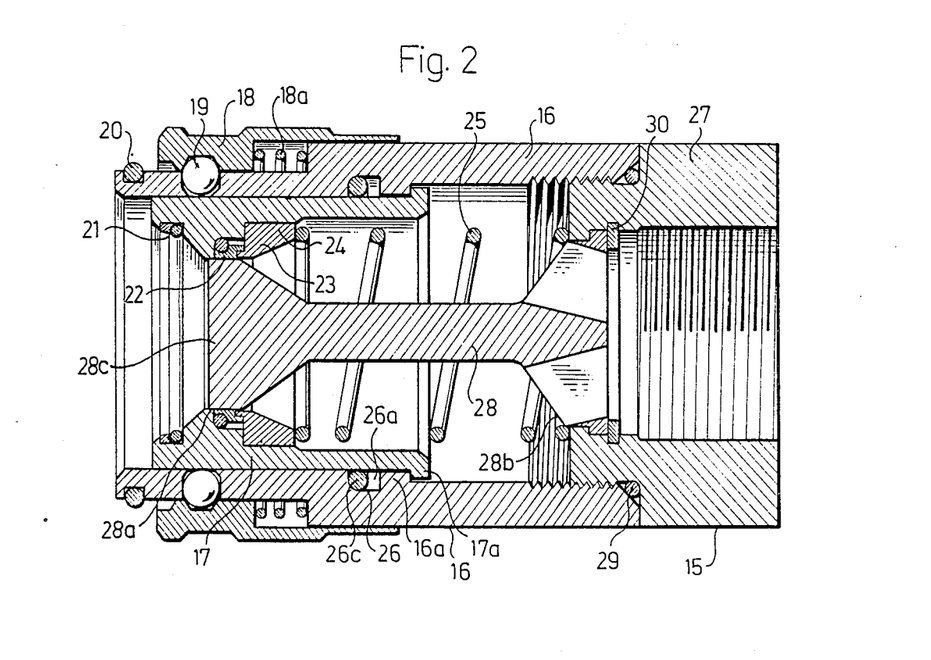
FIG. 2 is a longitudinal section view of the associated receiving nipple of the coupling.
Figure 3:
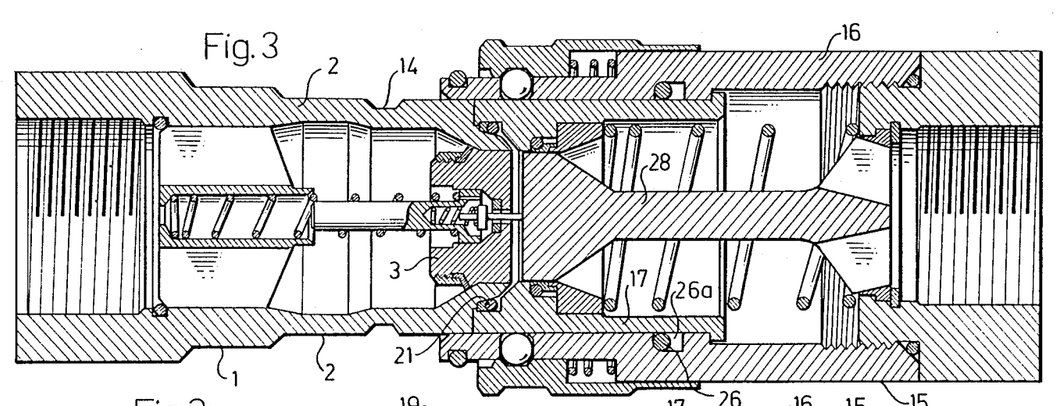
FIG. 3 shows the two coupling parts in a first position of the assembling before the insert nipple has been pushed into the receiving nipple.
Figure 3A:
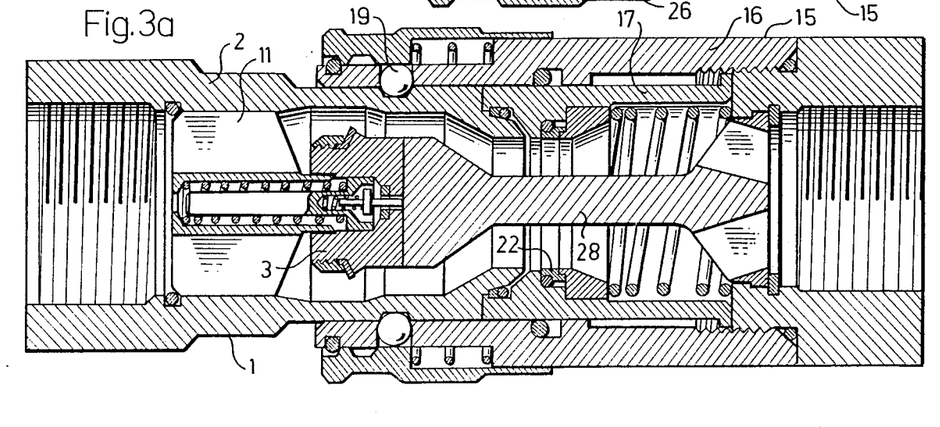
FIG. 3a shows the two coupling parts in their final position of the assembling, when liquid connection has been established.
Figure 6:
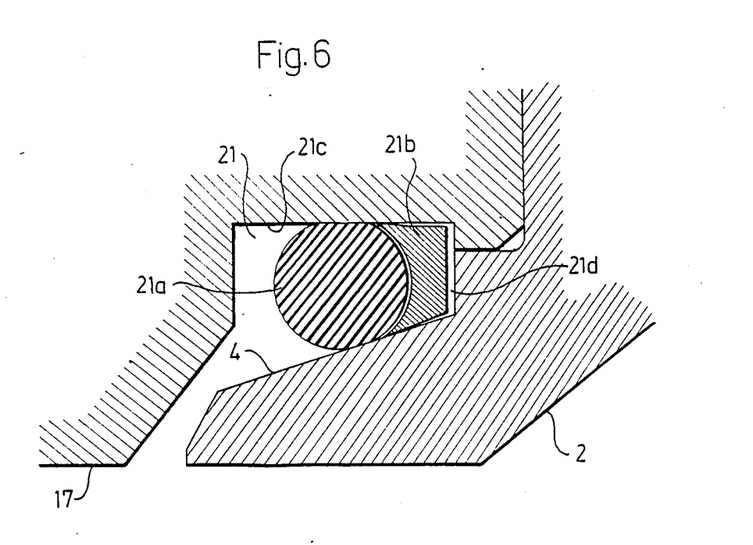
FIG. 6 shows a wedge seal at the orifice of the receiving nipple in sealing cooperation with the insert nipple.

FIG. 2 shows the second coupling part in the form of a receiving nipple 15 having an inner sealing sleeve 17. At its outer end or orifice the sealing sleeve is provided with a wedge seal 21 sealing against the wedge-forming conical outer surface 4 of the outer sleeve 2 first when the coupling parts have been brought together, as illustrated in FIGS. 3a and 6. This is particularly advantageous when one or both coupling parts 1, 15 are provided with pressure-eliminators including an eliminator plunger 6, prestressed by a spring 10 and having a seal 6a so that the evacuated spill from the eliminator is passed over to the other coupling part without spill. The insert nipple 1 is provided with a peripheral groove 14 which in coupling condition forms a ball race for steel balls 19 arranged in the receiving nipple 15. In the centre of the insert nipple there is a stationary valve central stay 28 which is provided with a rear retaining segment 28b and a front sealing valve body 28c with substantially cylindrical sealing surface 28a and a flat, free, outwardly facing engagement surface 28d located perpendicular to the central axis of the receiving nipple 15.

The wedge seal 21 which seals between the insert nipple 1 and the receiving nipple 15 is positioned close to the orifice or jointing place and shaped so that it can be replaced by a new seal without the coupling having to be removed from the hose or from any other fixed connection of varying size which would otherwise result in spill, thus causing damage and therefore increased costs, depending on the milieu in which the coupling is used.

Figure 4:
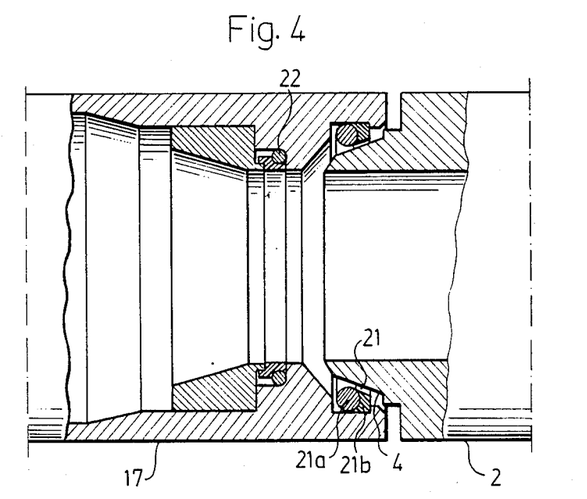
FIG. 4 shows the end sections of the two coupling parts immediately prior to achieving the first position as shown in FIG. 3.
Figure 5:
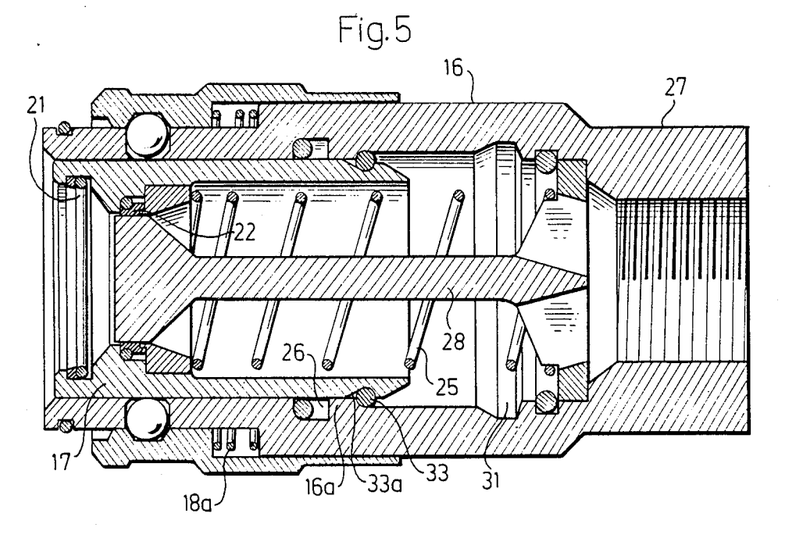
FIGS. 5, 5a, 5b, 5c show a receiving nipple of a coupling according to an alternative embodiment of the invention.
Figure 5A:
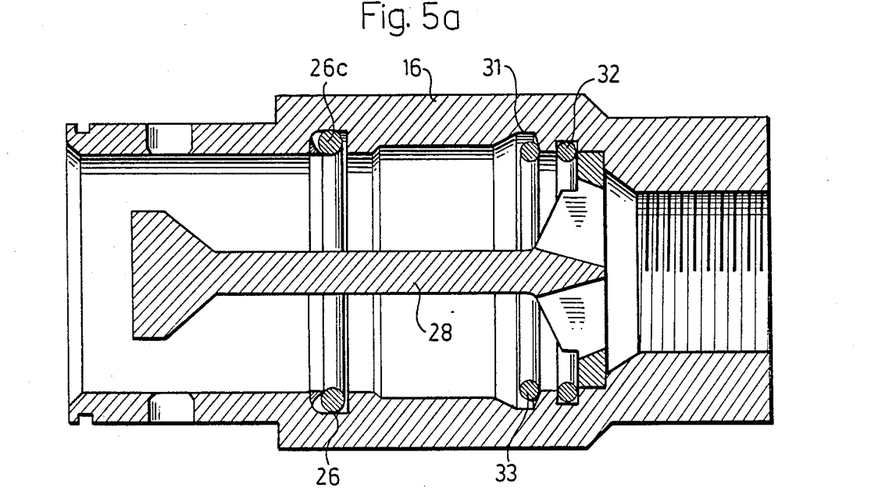
Figure 5B:
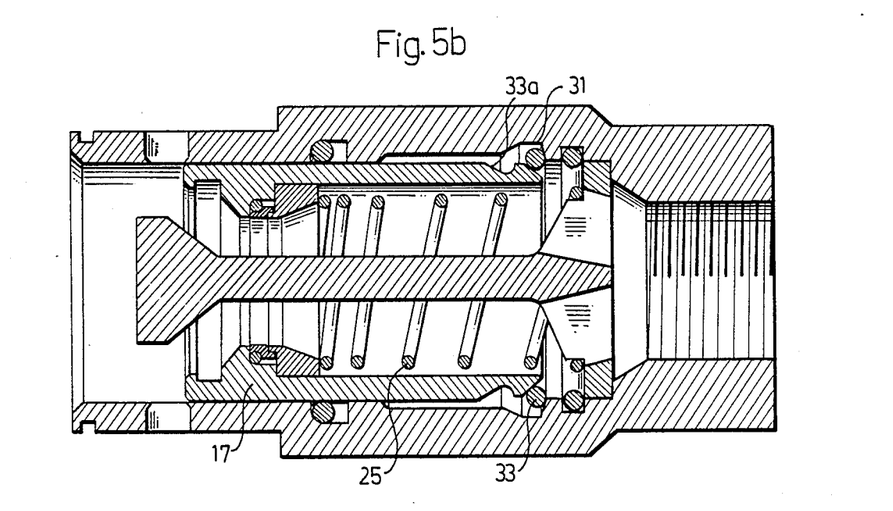
Figure 5C:
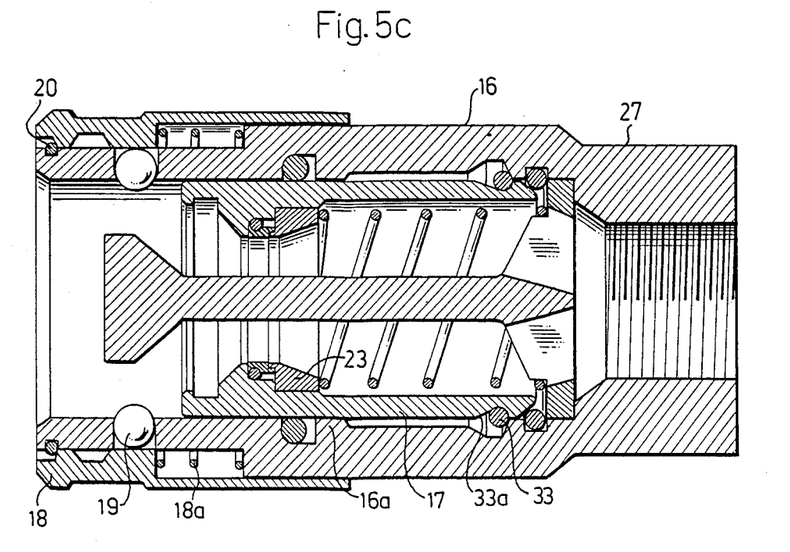

As will be clear from FIGS. 4 and 6, the wedge seal 21 comprises an O-ring 21a having relatively small cross-sectional area, and a conical support ring 21b. The wedge seal 21 is shaped in such a manner that air is not trapped and compressed inside the nipples upon joining them together. Such air would otherwise pass into the hydraulic system in a detrimental manner. Further, the wedge seal 21 is designed so that a two-step sealing function is obtained. The O-ring 21a, which has relatively small cross-sectional area, seals against the wedge-forming conical outer surface 4 of the outer sleeve 2 when the two nipples 1 and 15 are fully joined as shown in FIG. 6, and when this wedge sealing joint is subjected to pressure the O-ring 21a seals against the opposing sealing surface 4 and 21c and at the same time presses the conical support ring 21b in front of it into the wedge-shaped sealing space 21d. When a relatively high pressure has been reached, the support ring 21b will have been wedged into the sealing space 21d, providing effective sealing function between the sealing surfaces 4 and 21c and the conical support ring 21b.

The receiving nipple 15 is also provided with an inner seal 26 comprising an annular groove 26a formed on the inside of the outer sleeve 16. The location of the groove 26a in the outer sleeve 16 instead of in sealing sleeve 17 allows variation of the outer diameter of the outer sleeve 16 so that different types of sealing elements can be used, such as from only an O-ring up to strong U-cuff seals which require great increases of the mounting diameter.

The steel balls 19 and the inner seal 26 are positioned at such a distance from each other that the scratches caused by the steel balls on the sealing sleeve 17 after repeated couplings together of the nipples do not reach the seal 26. This would otherwise result in reduced service life of the sealing ring 26b.

Further, the sealing sleeve 17 is provided internally with a seal 22 (FIGS. 2 and 4) which is secured to prevent movement in radial direction and in disconnected condition it seals against the cylindrical sealing surface 28a of the valve central stay 28 (see FIG. 2), whereby the outer surface of the sealing sleeve 17 simultaneously seals against the seal 26. The valve central stay 28 is secured in the outer sleeve 16 by means of a retaining ring 30. The sealing sleeve 17 is provided with a rear support shoulder 17a designed to cooperate with and be retained by a support shoulder 16a of the outer sleeve 16 in order to absorb the pressure of the sealing sleeve area in disconnected condition, i.e. the surface between the sealing surface 28a of the valve central stay and the outer area of the sealing sleeve 17 multiplied by the pressure built up by the liquid. Since this rear support shoulder 17a absorbs or carries the entire pressure of the area of the sealing sleeve 17 instead of the entire force in disconnected condition being taken up by the valve central stay 28, its rod portion 28e between the sealing valve body 28c and the rear retaining segment 28b provided with a hole can be given a small cross-sectional area.

Figure 7:
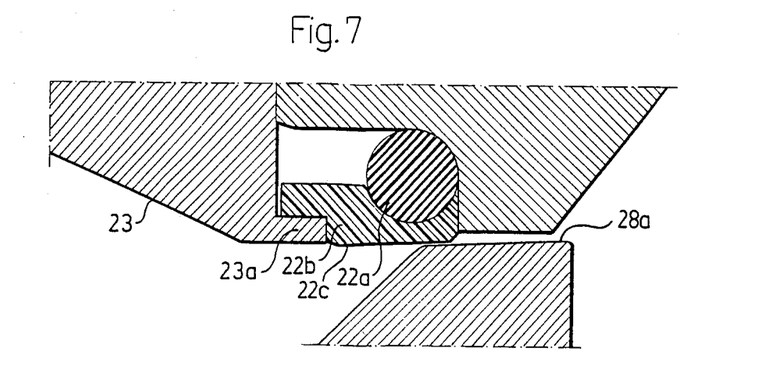
FIGS. 7 and 7a show a seal between a central stay and a sealing sleeve of the receiving nipple.
Figure 7A:
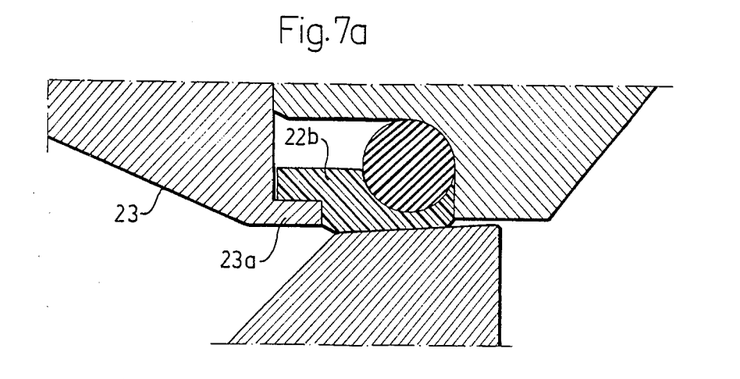

The seal 22 is a modification of the inner seal 26 described earlier. Besides being designed for the function described for seal 26, the seal 22 is also designed to be freely exposed to the flow of liquid without being forced out of place in the event of a surge flow. This is achieved in that a support ring 22b (FIGS. 7 and 7a) is manufactured of types of hard, resilient plastic material and it covers a sealing ring in the form of an O-ring 22a to completely protect it from the liquid flow. The seal joint 22 is held in its position by a flange 23a of a sealing holder 23. The inwardly facing contact surface 22c of the support ring 22b and the sealing surface 28a of the valve central stay 28 are suitably designed to form a small angle with each other, e.g. about 1°–2°. The front edge of the support ring 22b will thereby sliced easily up on the sealing surface 28a without any great friction, as illustrated in FIG. 7. According to an alternative embodiment (not shown) the function of the support ring 22b is obtained by forming the space receiving the O-ring 22a with opposing concave surfaces so that two opposite lips are formed which retain the O-ring in its said space. The lips define therebetween a narrow gap through which a cord a portion of the O-ring extends in order to sealingly engage with the sealing surface 28c of the valve central stay 28. Such an embodiment, however, requires an O-ring having a harder quality and a greater cross section diameter.

Due to its specific construction with respect to the position of the seal 26, the rear support shoulder 17a of the sealing sleeve 17 which absorbs or takes up axial forces, thus permitting small cross-sectional area of the valve central stay 28, and the seal 22 which can be freely exposed to the liquid/oil flow (see FIG. 3a) without being withdrawn at surge flows, the coupling can be manufactured having somewhat smaller outer dimension and still have a greater through-flow area than other known couplings in the same flow or connection class.

This design of the coupling also permits an alternative embodiment enabling fully automatic assembly. This is becoming an increasingly usual desire with manufacturers of couplings. The coupling part shown in FIG. 2 (the receiving nipple 2) has thus been amended to enable automatic assembly. This embodiment is shown in FIGS. 5, 5a, 5b, 5c. This alternative embodiment allows a saving in the costs of producing an internal thread in the outer sleeve 16 and an external thread in the outer connecting end portion 27 and an O-ring 29, in comparison with the coupling part according to FIG. 2. The material consumption is also reduced since the above-mentioned threads do not have to be produced when the sleeve 16 and connecting end portion 27 are manufactured in one piece.

The parts of the receiving nipple 15 are assembled by inserting the valve central stay 28 into the outer sleeve 16 (see FIG. 5a) and locking it there with a retaining ring 32. A seal 26 of standard type or of a type described below is then mounted in the intended groove 26a. A retaining ring 33 is placed in an expansion groove 31, after which a spring 25 is lowered towards the valve central stay 28. The sealing sleeve 17 is shaped differently (see FIG. 5), the rear support shoulder 17a being replaced by a groove 33a for a retaining ring 33 and with a wedge seal 21 and seal 22 pre-mounted. This sealing sleeve 17 is pressed down against the action of a spring 25 and to engagement with the retaining ring 33, the conical rear surface of the sealing sleeve 17 thus forcing the retaining ring 33 radially outwards into the expansion groove 31 so that the sealing sleeve 17 can be inserted further until the retaining ring 33 is catched by the groove 33a to be locked therein. Due to the design of the groove 33a it will not damage the seal 26 during the automatic assembly.

A spring 18a (FIG. 5c) is then mounted, the steel balls 19 are inserted in their positions in the outer sleeve 31 and a grip sleeve 18 is lowered towards the spring 18a enabling a retaining ring 20 to lock the grip sleeve 18.

Figure 8:
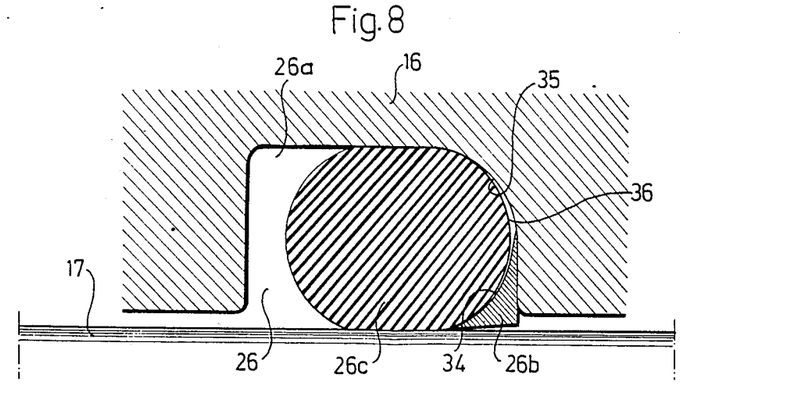
FIGS. 8 and 8a show an inner seal of the receiving nipple in resting position and pressure-influenced position, respectively.
Figure 8A:
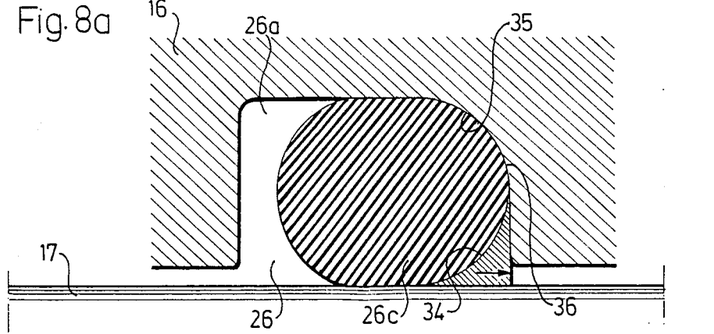

FIGS. 8 and 8a show a preferred embodiment of an inner seal 26 between the sealing sleeve 17 and outer sleeve 16, which can be used for both the receiving nipples 15 described herein. The form of the groove 26a and support ring 26b is adapted to the O-ring 26c so that this O-ring 26c cannot slide to and for in the groove 26a at fluctuating operating pressure and pressure pulses. Its service life is thus comparable to that if the operating pressure onto the seal were static. According to the invention the support ring 26b has substantially triangular cross section with a concave abutment surface 34, whereas the groove 26a has a correspondly curved or concave abutment surface 35 located close to and radially outside the support ring 26b. One half of the opposite abutment surface 36 of the O-ring 26c is thus pressed against the abutment surface 34 of the support ring 26b, while the other half of the opposite abutment surface 36 of the O-ring 26c is pressed against the abutment surface 35 of the groove 26a. The two abutment surfaces 34, 35 facing the O-ring 26c have together a radius or profile which is adapted to and agrees with the radius or profile of the O-ring at the abutment surface 36 when the O-ring 26c is in assembled and clamped state in the groove 26a as illustrated in FIG. 8a.

Figure 9:
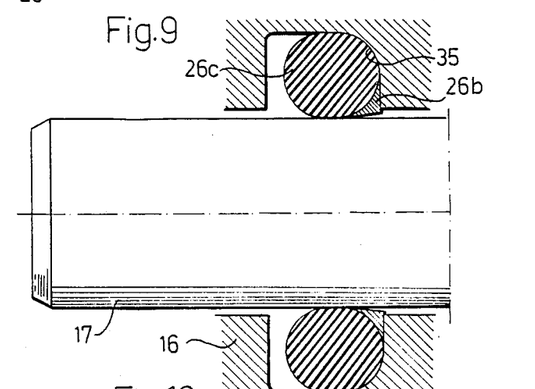
Figure 9A:
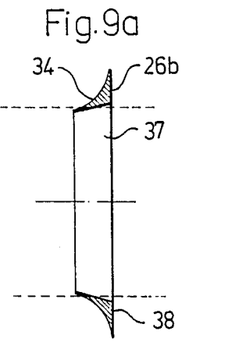

The construction of the support ring 26b described above can thus advantageously be manufactured of hard, resilient plastic material, such as polyacetals. This is possible when the support ring 26b is shaped and arranged as further shown in FIGS. 9 and 9a. The aperture 37 in the support ring decreases in diameter in the direction from the side 38 of the support ring extending into the groove 26a, the smallest diameter of the aperture 37 being less than the diameter of the inner sealing sleeve 17 and its largest diameter being equal to or slightly larger than the diameter of the sealing sleeve 17.

Figure 10:
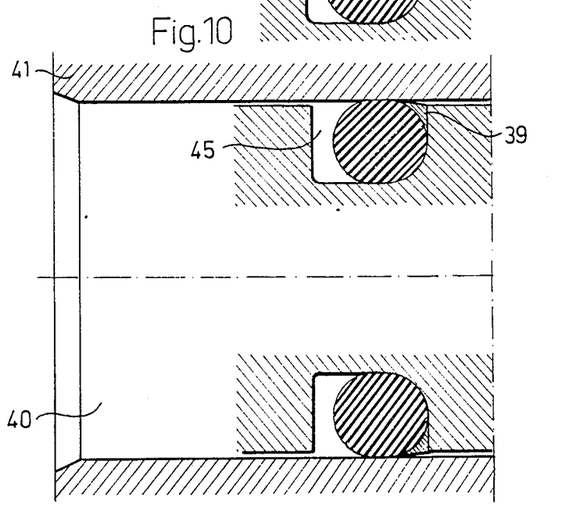
FIGS. 10 and 10a show a support ring for location in a pipe or sleeve.
Figure 10A:
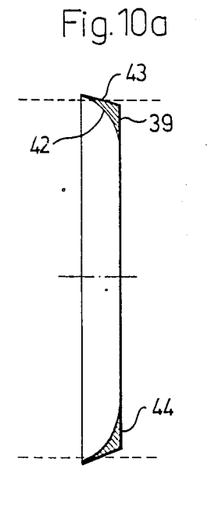

FIGS. 10 and 10a show a support ring 39 with corresponding but inverse triangular cross section, intended to be placed in the central aperture 40 of a pipe or a sleeve 41. The support ring 39 has a concave abutment surface 42 which faces obliquely inwardly instead of obliquely outwardly as in the embodiment described above. The outer surface 43 of the support ring thus increases in diameter from the of the support ring, which thus extends side 44 into the groove 45 for the seal. The greatest diameter of the outer surface 43 is thus greater than that of the aperture 40 in the pipe of sleeve and its smallest diameter is equal to or slightly less than the diameter of said aperture 40. In both cases, (FIGS. 9a and 10a) thin lip-shaped portions are formed, i.e. consisting of little material, so that they can easily be stretched radially outwardly and be compressed radially inwardly, respectively, in agreement with the diameter of the sealing sleeve 17 and the diameter of the central aperture 40, respectively. The support rings and abutment surfaces can thus be produced with less accurate tolerances. Harder plastic materials of the type such as polyacetals are not suitable for producing the support ring constructions mentioned in the introduction, which have substantially rectangular cross section, since they must abut against the base in that no play is permitted between the support ring and the surface to be sealed. Harder plastic materials of the type such as polyacetals would in that case require narrow tolerances both in the support ring and the abutment surfaces, as well as the expansion properties of the various materials at different temperatures having to be taken into consideration.

Due to its flat engagement surfaces 3b and 28d, the coupling according to the invention is of the spill-free type and thus it maintains such high standards from the environmental point of view that all technical functions can be used without causing any oil spill, for instance. A coupling with flat engagement surfaces such as 3b and 28d is normally designated a flat-nosed coupling.

The parts of the coupling according to the invention have such simple shape and design that production costs can be kept at a low level. The seal designs according to the invention are thoroughly considered with respect to placing and can be provided with simple O-rings and support rings while still withstanding high operating pressure. Furthermore, the coupling is so designed that all internal seals can be replaced with the aid of standard tools and no special equipment is required.

I claim:

1. A coupling for connecting liquid conduits, comprising an insert nipple (1) and a receiving nipple (15), said nipples being axially movable in relation to each other for connection and disconnection, said insert nipple (1) comprising a stationary sleeve (2) with a sealing valve body (3) spring-biased and inwardly axially movable therein, said receiving nipple (15) having an outer sleeve (16), an inner spring-biased and inwardly axially movable sealing sleeve (17) and a stationary valve central stay (28) which in disconnected condition sealingly cooperates with the sealing sleeve (17), characterised in that the sealing sleeve (17) is provided at its outer end portion with an inner wedge seal (21) arranged to sealingly cooperate with a wedge-forming conical outer surface (4) on the front end portion of the outer sleeve (2) and comprising a conical support ring (21b); that an inner seal (26) is arranged in a groove (26a) in the outer sleeve (16) for radial sealing cooperation with the sealing sleeve (17) which is free from sealing grooves; that the distance between circumferentially located locking balls (19) in the outer sleeve (16) and said inner seal (26) is greater than the distance within which the sealing sleeve (17) is axially movable inside the outer sleeve (16); that the sealing sleeve (17) is provided on its inner side with a seal (22) which in disconnected condition is arranged to seal against a substantially cylindrical sealing surface (28a) of a sealing valve body (28c) of the valve central stay (28) and which comprises a sealing ring (22a) and a seal holder (23); and that the sealing sleeve (17) and outer sleeve (16) are provided with cooperating support means (17a, 16a; 33, 33a, 16a) permitting the sealing sleeve (17) to take up liquid pressure in disconnected condition in order to relieve the valve central stay (28).

2. A coupling according to claim 1, characterised in that said seal (22) comprises a support ring (22b), and that said seal holder (23) is provided with a flange (23a) arranged to restrain the support ring (22b) and sealing ring (22a) against radial displacement.

3. A coupling according to claim 2, characterised in that the inwardly facing contact surface (22c) of said support ring (22b) and the sealing surface (28a) of said valve central stay (28) form an angle with each other of about 1° to 2°.

4. A coupling according to any of claims 1 to 3, characerised in that the insert nipple (1) has a relatively short sealing valve body (3) with an internally centering surface (3a), and that the sealing valve body (3) in connected condition of the coupling is arranged so that its centering surface (3a) is centeringly aligned by an externally centering surface (11a) of a central stay (11) inside the insert nipple.

5. A coupling according to any of claims 1 to 4, characterised in that the outer sleeve (16) and outer connecting end portion (27) of the receiving nipple (15) are prepared in two separate parts which are joined by a screw joint.

6. A coupling according to any of claims 1 to 4, characterised in that the outer sleeve (16) and outer connecting end portion (27) of the receiving nipple (15) are prepared in one piece, whereby the other parts of the receiving nipple (15) can be assembled with said piece in an automatic manner.

7. A coupling according to any of claims 1 to 6, characterised in that the inner seal (26) between the sealing sleeve (17) and the outer sleeve (16) comprises a support ring (26b) with substantially triangular cross section, in which two sides are substantially perpendicular to each other and the third side is in the form of a concave abutment surface (34) for cooperation with an O-ring (26c), one of said sides extending into the groove (26a) to approximately half its radial extension and that other or inner half of the radial extension of the groove (26a) having a curved abutment surface (35) which, together with the concave abutment surface (34) of the support ring (26b), forms a radius corresponding to the radius or profile of the O-ring (26c) at its abutment surface (36) in assembled and clamped state in sealing condition.

8. A coupling according to claim 7, characterised in that the aperture (37) of the support ring (26b) decreases in diameter from the side (38) of the support ring extending into the groove (26a), the smallest diameter of the aperture (37) being less than the diameter of the inner sealing sleeve (17) and the largest diameter being equal to or slightly greater than the diameter of the sealing sleeve (17).

9. A coupling according to claim 7 or 8, characterised in that the support ring is manufactured from a relatively hard plastic material of the type such as polyacetals and the like.

* * * * *